(12) United States Patent
Le Meur

(10) Patent No.: US 11,027,379 B2
(45) Date of Patent: Jun. 8, 2021

(54) QUICK-CLAMPING SPINDLE

(71) Applicant: NORELEM SAS, Fontaine les Gres (FR)

(72) Inventor: Olivier Le Meur, Saint Parres aux Tertres (FR)

(73) Assignee: NORELEM SAS, Fontaines les Gres (FR)

(*) Notice: Subject to any disclaimer, the term of this patent is extended or adjusted under 35 U.S.C. 154(b) by 0 days.

(21) Appl. No.: 16/488,664

(22) PCT Filed: Feb. 26, 2018

(86) PCT No.: PCT/FR2018/050451
§ 371 (c)(1),
(2) Date: Aug. 26, 2019

(87) PCT Pub. No.: WO2018/158532
PCT Pub. Date: Sep. 7, 2018

(65) Prior Publication Data
US 2020/0108476 A1   Apr. 9, 2020

(30) Foreign Application Priority Data
Feb. 28, 2017 (FR) .................................. 1770200

(51) Int. Cl.
B23Q 1/26 (2006.01)
(52) U.S. Cl.
CPC ...................... B23Q 1/26 (2013.01)
(58) Field of Classification Search
CPC ..... B23B 31/113; B23B 31/22; B23B 31/107; B23B 31/1071; B23B 23/00; B23B 2240/04; B23Q 1/26
See application file for complete search history.

(56) References Cited

U.S. PATENT DOCUMENTS 1,862,859 A * 6/1932 Michel ................... B25D 17/04
285/84
2,544,809 A    3/1951 Stanley
2,658,416 A    11/1953 Duerksen
(Continued)

FOREIGN PATENT DOCUMENTS

FR    2972664 A1    9/2012
FR    2995544 A1    3/2014

OTHER PUBLICATIONS

International Search Report for corresponding PCT application No. PCT/FR2018/050451, dated Jun. 15, 2018.

Primary Examiner — Nicole N Ramos
(74) Attorney, Agent, or Firm — Notaro, Michalos & Zaccaria P.C.

(57) ABSTRACT

Quick-clamping spindle contains two pieces, firstly a spindle body supplied with a clamping member at one of the ends thereof and secondly a control rod for controlling the use/withdrawal of said clamping member, which rod is contained in said spindle body as well as a member for maneuvering and controlling the clamping member placed at the other of the ends of said spindle body, which simultaneous control member has a helical ramp provided in the wall of said spindle body engaging a transverse shaft borne by said control rod. The spindle further has a device for rotationally blocking the control rod in the spindle body. It is intended for use in the machining field.

6 Claims, 4 Drawing Sheets

(56) References Cited

U.S. PATENT DOCUMENTS

| | | | | |
|---|---|---|---|---|
| 2,731,273 A * | 1/1956 | Edens | .................... | B23B 31/113 |
| | | | | 279/81 |
| 3,708,178 A * | 1/1973 | Lauricella | ........... | B23B 31/1071 |
| | | | | 279/81 |
| 3,747,946 A * | 7/1973 | Edens | .................... | B23B 31/113 |
| | | | | 279/81 |
| 4,122,755 A * | 10/1978 | Johnson | ................ | B23B 31/003 |
| | | | | 408/238 |
| 4,188,041 A * | 2/1980 | Soderberg | ............... | B23B 31/22 |
| | | | | 279/75 |
| 4,290,720 A * | 9/1981 | Ferreira | ................ | B23B 31/263 |
| | | | | 279/75 |
| 4,456,271 A * | 6/1984 | Kern | .................... | B23B 31/113 |
| | | | | 279/140 |
| 4,553,886 A * | 11/1985 | Vasilchenko | ..... | B23B 29/03446 |
| | | | | 279/8 |
| 4,626,146 A * | 12/1986 | Neumaier | ............ | B25D 17/088 |
| | | | | 279/19.6 |
| 4,906,147 A * | 3/1990 | Friesinger | ............. | B23B 31/113 |
| | | | | 279/97 |
| 6,000,888 A * | 12/1999 | Hartman | ............. | B23B 31/1071 |
| | | | | 408/239 R |
| 6,394,710 B1 * | 5/2002 | Kurz | ................ | B23B 29/03457 |
| | | | | 408/1 R |

\* cited by examiner

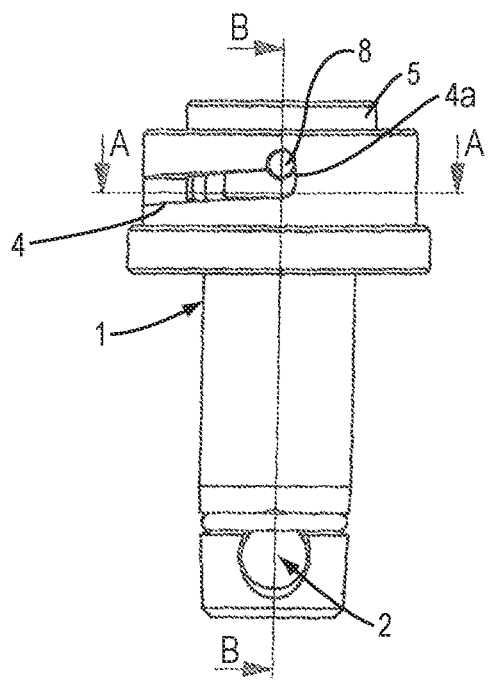
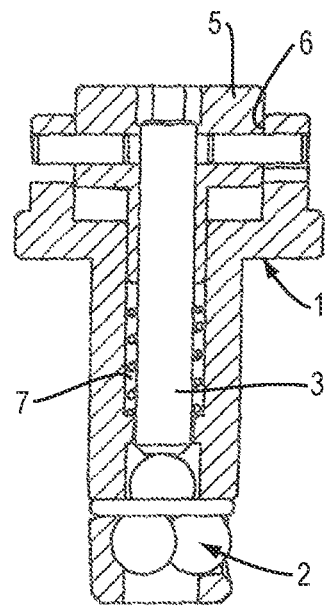
FIG. 1A  FIG. 1C
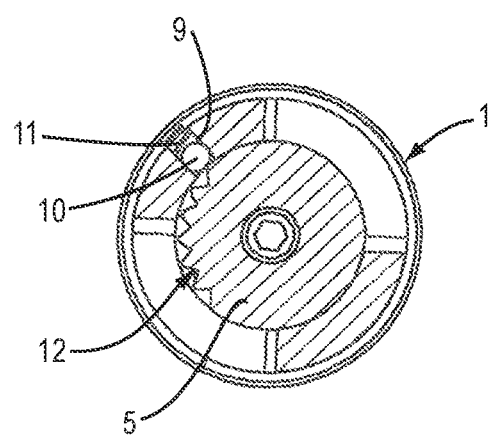
FIG. 1B

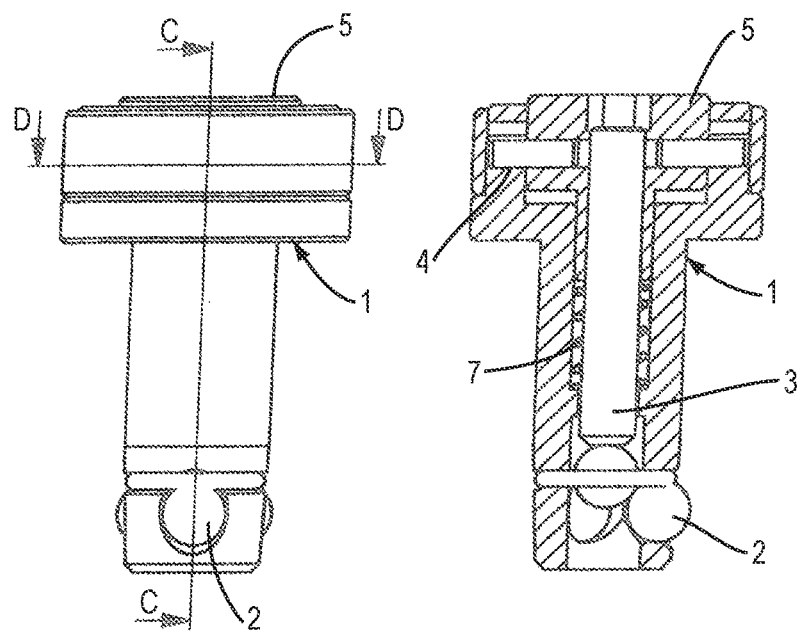
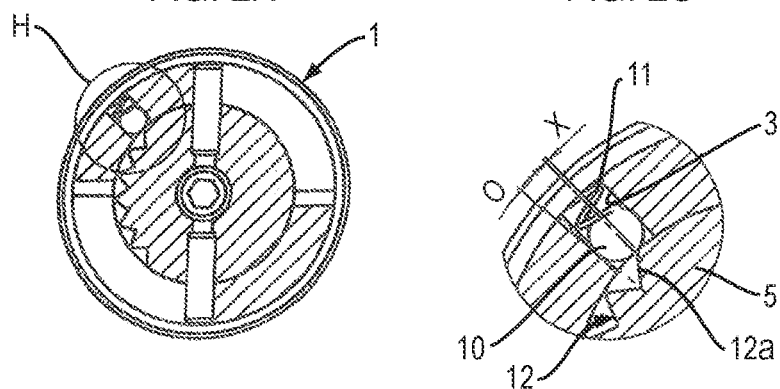
FIG. 2A   FIG. 2C
FIG. 2B   FIG. 5

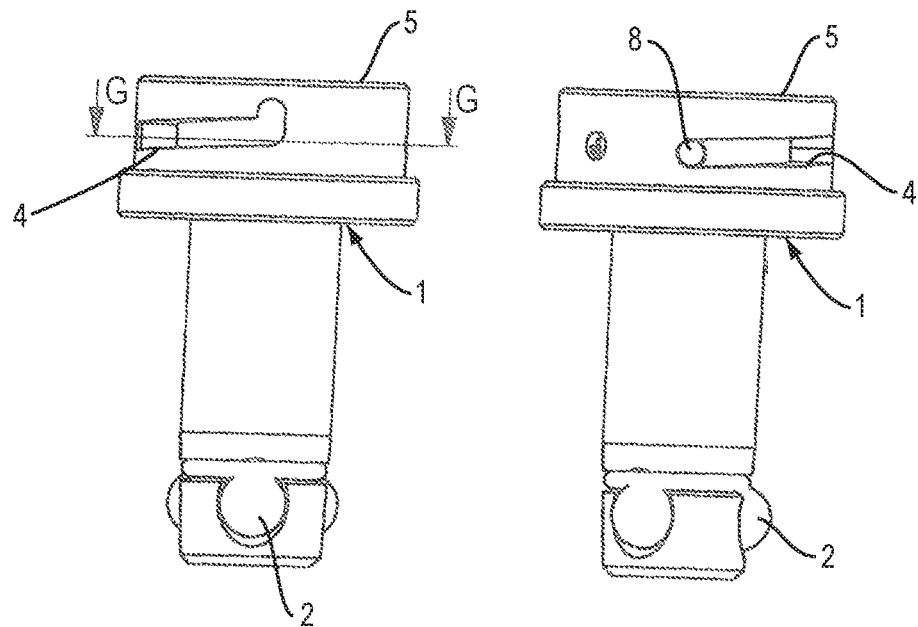
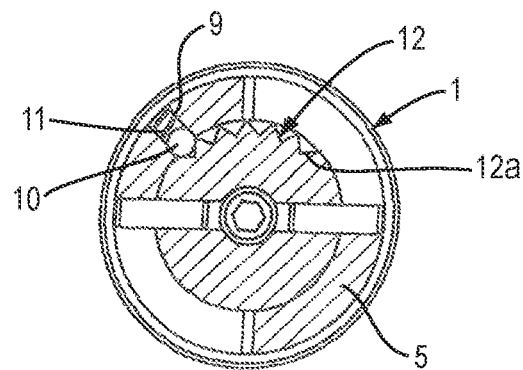
FIG. 4A
FIG. 4C
FIG. 4B

QUICK-CLAMPING SPINDLE

TECHNICAL FIELD

The present invention relates to a quick-clamping spindle including a positional pre-blocking device.

BACKGROUND

The quick-clamping spindle is, in particular, described in the two documents FR-2.972.664-A and FR-2.995.544-A. Such a spindle comprises a spindle body supplied with a clamping member at one of the ends thereof, a control rod for controlling the use/withdrawal of the clamping member, which rod is contained in the spindle body, and a member for maneuvering and controlling the clamping member placed at the other of the ends thereof on a clamping shoulder for one or more pieces to be clamped. The spindle includes a member for simultaneously controlling the use/withdrawal of the member for progressively clamping the pieces between the clamping member and a clamping support. This simultaneous control member comprises a transversal shaft borne by the control rod and slidingly interlocked in a slot provided in the wall of the spindle body.

If such an assembly is generally satisfactory, it has however become clear that, in some configurations and/or uses, it would be desirable to be able to obtain positional pre-blocking before achieving complete clamping.

SUMMARY

Therefore, one of the aims of the present invention is to provide a quick-clamping spindle which allows positional pre-blocking or pre-locking.

Another aim of the invention is to provide such a spindle at a competitive cost.

These aims, as well as others which will emerge hereafter, are achieved by a quick-clamping spindle comprising two pieces, firstly a spindle body supplied with a clamping member at one of the ends thereof and secondly a control rod for controlling the use/withdrawal of the clamping member, which rod is contained in the spindle body, as well as a member for maneuvering and controlling the clamping member placed at the other of the ends thereof, which simultaneous control member comprises a ramp provided in the wall of the spindle body engaging a transverse shaft borne by the control rod, which spindle is characterized, according to the present invention, in that it further comprises a device for rotationally pre-locking the control rod in the spindle body, which device comprises, firstly, a male element borne by one of the two pieces forming the clamping spindle and, secondly, a female element borne by the other of these two pieces, the male element comprising a radial housing provided in the spindle body and open toward the control head and a lug located in this radial housing, a spring being located in the radial housing and having an end which rests in the bottom of this housing and another end which bears on the lug, the female element being formed from a series of cavities that are located on the circumference of the control head at the same level as the radial housing, the first cavity being angularly offset with respect to the axis of the lug by an angle such that, once the control rod is free to rotate, the lug can be inserted into this first cavity.

According to an embodiment of the present invention, the lug is formed by a ball.

According to an embodiment of the present invention, this series of cavities is formed by grooves parallel to the rotational axis of the control head.

Preferably, these grooves in the shape of a V are placed over the entire height of the wall of the control head.

DESCRIPTION OF THE FIGURES

The following description that is in no way limiting must be read with reference to the appended figures, wherein:

FIG. 1a is a front view of a clamping spindle according to the present invention in the unclamped position;

FIG. 1b is a sectional view along the line A-A of FIG. 1a;

FIG. 1c is a sectional view along the line B-B of FIG. 1a;

FIG. 2a is a front view of the clamping spindle, when the clamping spindle is in the approach position;

FIG. 2b is a section along the line D-D of FIG. 2a,

FIG. 2c is a sectional view along the line C-C of FIG. 2a, when the clamping spindle is in the clamped position;

FIG. 3b is a section along the line E-E of FIG. 3a,

FIG. 3c is a sectional view along the line F-F of FIG. 3a,

FIG. 4a is a front view of the clamping spindle, when the clamping spindle is in the clamped position;

FIG. 4b is a section along the line G-G of FIG. 4a; and

FIG. 4c is a rear view of the clamping spindle illustrated in FIG. 4a;

FIG. 5 is a view of the detail H of FIG. 2b.

DETAILED DESCRIPTION OF EMBODIMENTS

Figure 3A:
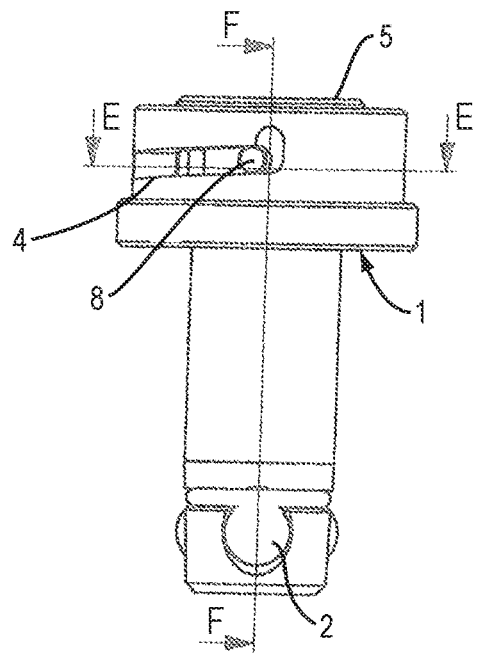
FIG. 3a is a front view of the clamping spindle, when the clamping spindle is in the pre-blocking position.

As can be seen in particular in FIGS. 1 and 3, a quick-clamping spindle according to the present invention comprises in particular, firstly, a spindle body 1 supplied with a clamping member 2 at one of the ends 1a thereof, and, secondly, a control rod 3 for controlling the use/withdrawal of the clamping member 2, which rod is contained in the spindle body 1. This clamping spindle also comprises a member for maneuvering and controlling this clamping member 2 placed at the other end of the control rod 3.

This maneuvering and clamping member comprises, firstly, a helical ramp 4 provided in the wall of the spindle body 1 and, secondly, a maneuvering head 5 which is placed at the top of the control rod 3, the diameter of which is greater than that of this control rod 3 but less than that of the spindle body 1 and which includes at least one transverse shaft 8 engaging the helical ramp 4. For balance purposes in particular, it can be advantageous for the maneuvering head 5 to include two transverse shafts 8 and 8' which are diametrically opposite as in the present exemplary embodiment.

The helical ramp 4 includes, at the top final end thereof, a vertical notch 4a directed toward the maneuvering head 5: when the spindle is in the unclamped position, the finger 8, in the present exemplary embodiment, is blocked in this notch 4a.

Thus, this maneuvering head 5 is located, completely or partially, in a cylindrical housing 6 located at the end 1b of the spindle body 1 opposite the end 1a thereof supplied with the clamping member 2.

The clamping member is, in the present exemplary embodiment, formed from three balls 2 spread out at 120° in a plane orthogonal to the end 1a of the spindle body 1.

The assembly formed from the maneuvering head 5 and from the control rod 3 is placed inside the spindle body 1 and mounted on the latter by means of a return spring 7 bearing, via one of the ends thereof, on the face of this maneuvering head 5 facing the control rod 3 and, via the other end thereof, on a bearing surface located in the spindle body 1 and through which the control rod 3 passes.

According to the present invention, the transverse shaft is formed by a finger 8 which engages the helical ramp 4 provided in the spindle body 1.

Such a clamping spindle and the operation thereof are, for example, described in the document FR-2.995.544-A, to which reference can be made.

Pushing in the maneuvering head 5 forces the finger 8 down toward the helical ramp 4: "approach" refers to the fact that the finger 8 comes into contact with this helical ramp 4 (FIGS. 2a to 2c). By turning this maneuvering head 5 through an extremely small angle, the finger 8 is interlocked in this helical ramp 4: the spindle is then pre-blocked, since the pushing and then rotation action exerted on the maneuvering head 5 has also resulted in a pushing action on the control rod 3 and consequently the clamping member 2 starting to emerge, which allows this pre-blocking position (FIGS. 3a to 3c): if the maneuvering head 5 is then released, the spindle remains in the pre-blocking position as described hereafter.

Indeed, according to the present invention, the clamping spindle furthermore comprises a device for rotationally pre-locking the control rod 3, and therefore the maneuvering head 5, in the spindle body 1: thus, the maneuvering head 5 and the control rod 3 are held in this partial clamping or pre-blocking position.

The pre-locking device comprises, firstly, a male element borne by one of the two pieces forming the clamping spindle, and, secondly, a female element borne by the other piece forming the clamping spindle.

According to the present exemplary embodiment, the male element is borne by the fixed part, in this case the spindle body 1 according to the present exemplary embodiment, and the female element by the mobile piece, in this case the maneuvering head 5.

The male element comprises a radial housing 9 provided in the spindle body 1 and open toward the maneuvering head 5 and a lug 10 which is located in this radial housing 9. Placed in this radial housing 9 is a spring 11, a free end 11a of which rests in the bottom of this housing 9, with the other end, 11b which is free, bearing on the lug 10. According to the present exemplary embodiment, the lug 10 is formed by a ball. However, in other alternative embodiments, the lug has another form.

As regards the female element, it is formed from a series of cavities 12 located on the circumference of the maneuvering head at the same level as the radial housing 9.

According to the present exemplary embodiment, this series of cavities 12 is formed by grooves parallel to the rotation axis of the maneuvering head 5: these grooves 12, preferably in the shape of a V, are placed, for example, over the entire height of the wall of the maneuvering head 5.

Thus, the ball 10 is pushed by the spring 11 into one of the grooves 12: the diameter of this ball 10 is slightly less than the distance between the two tips of the V.

Figure 3C:
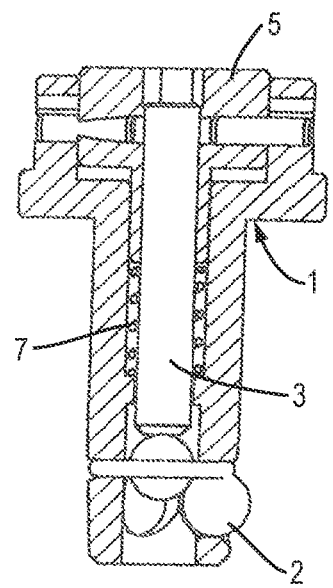
Figure 3B:
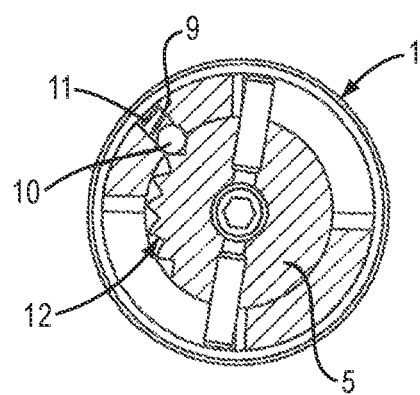

By pressing on the maneuvering head 5, the finger 8 comes into contact with the helical ramp 4, and by starting to turn this maneuvering head 5, the finger 8 enters into approach (FIGS. 2a to 2c) and the ball 10 approaches the first groove 12a (FIG. 2b). By continuing to turn the maneuvering head 5, the ball 10 enters this first cavity 12a, the finger 8 thus moving from the approach position thereof to the pre-blocking position thereof: the spindle is thus in a pre-blocking or pre-locking position (FIGS. 3a to 3b). The ball 10 is held in this first cavity 12a by the action of the spring 11.

By exerting an additional torque on the maneuvering head 5, the finger 8 follows the helical ramp and the grooves 12 move along in front of the ball 10 which, at the end of travel, must be blocked in a groove and be held therein also by the action of the spring 11.

As will have been understood by a person skilled in the art, hard points are created in the clamping travel which will make it possible to hold the finger 8 in the helical ramp 4 at various angular positions determined by the position of the cavities 12.

To obtain this automatic interlock of the helical ramp 4 at the approach travel end, it is necessary to position, in a relatively precise manner, the first cavity with an angular offset with respect to the approach travel alignment. Thus, when the control rod 3 is freed to rotate around the axis thereof at the approach travel end, the ball 10 pushed by the spring 11 thereof will attempt to interlock in the slightly offset cavity and will rotate the control rod 3 around the axis thereof such as to then be housed in the first cavity. The finger 8 is then slightly interlocked in the helical ramp 4 and the ball 10, pushed back into the cavity thereof, holds this position, hence the notion of blocking at the approach travel end.

The angle corresponding to the angular offset described above is chosen such that the center of the ball 10 is slightly offset by a value X with respect to the starting point of the cavity: since the control rod 3 is free to rotate, the ball 10 can enter into the cavity to make the control rod turn.

The control rod 3 will rotate around the axis thereof by an angle $\alpha$ in order to interlock the finger 8 in the helical ramp 4. To maximize the value of this angle $\alpha$ and thus maximize the interlocking of the finger 8 in the helical ramp 4, it is necessary to minimize the value of the dimension X.

To remove this clamping spindle, it is sufficient to turn the maneuvering head in the opposite direction to make the fingers 8 and 8' follow the helical ramp 4 until this finger enters the notch 4a thus making the maneuvering head move upward again and the clamping member 2 retract.

Such a spindle according to the present invention is particularly useful for positionally holding pieces to be machined.

The invention claimed is:

1. A quick-clamping spindle assembly comprising:
   a spindle body;
   a control rod; and
   a maneuvering head;
   wherein the spindle body has a wall, two ends and a clamping member at one of the ends thereof; the clamping member comprising a plurality of protruding structures disposed on the end of the spindle body thereof;
   wherein the maneuvering head is disposed within the spindle body and the control rod is disposed within the maneuvering head, for controlling use/withdrawal of said clamping member;
   wherein the control rod is axially movable within the spindle body and cooperates with the clamping member such that an axial pushing action on the control rod causes the plurality of protruding structures of the clamping member to radially emerge from the spindle body,
   the spindle assembly further comprising:
   at least one transverse shaft provided on the maneuvering head and a helical ramp provided in the wall of said spindle body engaging the transverse shaft, and a device for rotationally blocking said control rod in said spindle body;

the device comprising a male element disposed on the spindle body and a female element disposed on the maneuvering head;

the male element comprising a radial opening provided in the spindle body being open toward the maneuvering head, a lug housed in said radial opening, and a spring located in said radial housing having an end resting against a bottom of the radial opening and another end bearing on the lug, the female element comprising a series of cavities including a first cavity located on a circumference of the maneuvering head at a same level as the radial opening, the first cavity being angularly offset with respect to an axis of the lug by an angle such that, once the control rod is free to rotate, the first cavity is in such a position that the lug is inserted into the this first cavity.

2. The quick-clamping spindle as claimed in claim 1, characterized in that the lug is formed by a ball (10).

3. The quick-clamping spindle as claimed in claim 1, characterized in that the series of cavities is formed by grooves parallel to the rotational axis of the maneuvering head.

4. The quick-clamping spindle as claimed in claim 3, characterized in that the grooves have a V shape.

5. The quick-clamping spindle of claim 1 wherein the plurality of protruding structures comprises three balls spread out in a plane orthogonal to the end of the spindle body.

6. The quick-clamping spindle of claim 1 wherein the maneuvering head, control rod, and clamping member are disposed within the spindle to interoperate such that when the maneuvering head is moved upward the clamping member retracts into the spindle.

* * * * *